Aug. 12, 1958 W. S. HARVEY ET AL 2,847,632
ELECTRIC MOTOR CONTROLS
Filed April 25, 1957 4 Sheets-Sheet 1

INVENTORS
WINSTON S. HARVEY
HENRY EISLER
BY Elmer J. Gorn
ATTORNEY

INVENTORS
WINSTON S. HARVEY
HENRY EISLER
BY
ATTORNEY

INVENTORS
WINSTON S. HARVEY
HENRY EISLER
BY
ATTORNEY

United States Patent Office 2,847,632
Patented Aug. 12, 1958

2,847,632

ELECTRIC MOTOR CONTROLS

Winston S. Harvey, Bedford, and Henry Eisler, Brighton, Mass., assignors to Raytheon Manufacturing Company, Waltham, Mass., a corporation of Delaware Application April 25, 1957, Serial No. 655,148

11 Claims. (Cl. 318—327)

This invention relates to D. C. electric motor speed control systems, and, more particularly, to the type supplied from a three-phase A. C. power source and having a D. C. motor with series and shunt field windings.

In such systems, controlled amounts of D. C. may be applied to the armature of a D. C. motor from a three-phase A. C. source by the use of controlled gaseous discharge tubes. Usually, six such tubes are needed to form a three-phase full wave rectifier. By the arrangement of the present invention, only three of the rectifying devices need have grid or other control devices. The other three rectifiers may be solid-state rectifiers. This is accomplished by connecting each gaseous discharge device in series with one or more rectifiers and this combination in parallel across the armature and series field connected, if one is used, with the anode of each gaseous discharge device connected to a different phase of the line.

For efficient operation of such a power supply, the current through the three gaseous discharge devices should be kept as nearly equal as possible. By this invention this is accomplished by taking a sample of the current through each tube by means of a current transformer to develop a voltage drop proportional to the individual currents and also passing currents proportional to the current through each rectifier tube through a common resistor to develop a voltage proportional to the average current through all the rectifier tubes. These voltages are compared and any difference in potential is applied to the circuit that determines the firing angle of the rectifier tube whose current differs from the average in a direction to bring the current through this tube back to the average current.

In some applications it is desirable to maintain the power output constant while the speed varies over a range. In such a system, should the reference voltage which controls the speed of the motor suddenly be reduced when the motor is operating at rated speed, the motor operates as a generator and the armature voltage tends to reach several times its normal value for rated speed. This may be in the order of four times. To prevent this over-voltage, a portion of the armature voltage is compared to a reference voltage across a diode which conducts when the armature voltage exceeds the normal value. This conduction of the diode establishes a bias in the grid circuit of a normally full-firing thyratron operating in conjunction with a second thyratron. This bias in the grid circuit of the first thyratron reduces its firing angle and, consequently, the shunt field current to a value which will limit the armature voltage to a safe value.

Varying portions of the reference voltage as determined by biased diodes are amplified by a transistor and magnetic amplifier and applied to the grid control circuit of the second thyratron. This gives a speed proportional to the reference voltage over the entire speed range, counteracting nonlinearities in the shunt field winding and the thyratron field supply components.

In addition, it is necessary to stop the motor if the field current drops below the desired minimum value. This is accomplished in the present invention by means of a field loss relay controlled by a modified Ramey-type magnetic amplifier with positive feedback. Control of the feedback determines the field current at which the relay de-energizes. The result is a D. C. motor speed control taking advantage of the useful characteristics of magnetic amplifiers and semiconductor diodes and transistors. The load half-cycle firing angle or saturating point of the magnetic amplifiers is independent of a 10 percent change in the line voltage. The turns per volt ratio of the magnetic amplifiers have been selected so that, with zero control impedance or control voltage, the core does not become saturated during the control half-cycle, even though the line voltage is 10 percent above normal. The minimum firing angle of each of the magnetic amplifiers and thus the minimum speed are functions of the control signal. The armature supply circuit also enables the cheaper solid-state rectifiers to be substituted for three of the ignitrons and associated control circuits in a three-phase power supply.

Other and further advantages and features will be apparent as the description progresses, reference being had to the drawings in which:

Fig. 6 is a detailed view of a portion of Fig. 2;

Figure 1:
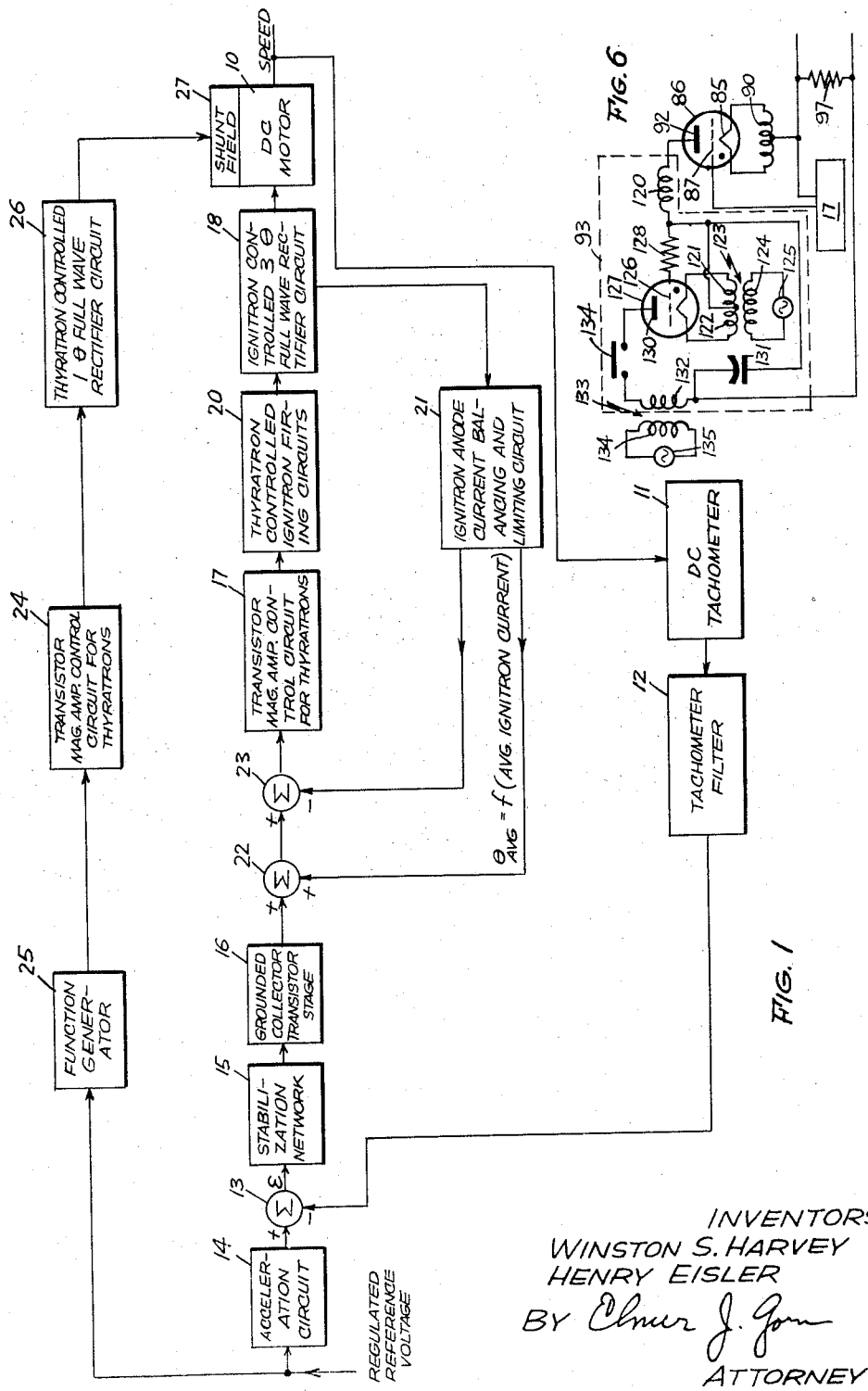
Fig. 1 is a block diagram of the system of the invention.

In Fig. 1, the reference numeral 10 designates a D. C. motor controlled by the system of the invention. The shaft of this motor drives a D. C. tachometer 11, the D. C. output of which is filtered in a tachometer filter 12 and applied to a comparison or summing circuit 13, to which is also applied a variable regulated reference voltage which determines the operating speed of the motor after being integrated in an acceleration circuit 14, which delays the effect of changes in this reference voltage for several cycles until other portions of the control system can become effective. The error voltage from the comparison circuit 13 is integrated in a stabilization network 15 to improve the frequency response of the system and permit good speed regulation without hunting. The output of the stabilization network is applied to a grounded collector transistor amplifier stage 16 which serves to match the high impedance of the stabilization circuit to the relatively low impedance of the inputs to subsequent grounded emitter transistor-magnetic amplifier stages 17, each of which controls the firing circuit of a thyratron of the three-phase power supply for the armature of the motor 10. This power supply comprises three ignitrons or mercury-pool gaseous discharge devices and three semiconductor diodes connected in a full-wave three-phase rectifier circuit 18. The firing time for each ignitron is controlled by a grid-controlled gaseous discharge device or thyratron 20. The firing time of each of these thyratrons is, in turn, controlled by one of the stages of grounded emitter transistor-magnetic amplifier 17. Voltages are derived in an ignitron anode-current balancing and limiting circuit 21, which are compared in summation circuits 22 and 23 to produce the proper controlled voltage to be applied to the inputs to the transistor and magnetic amplifier circuits 17. A portion of the regulated reference voltage is also applied to the input to a transistor-magnetic amplifier circuit 24 after modification in a function generator 25 which corrects for non-linearities of the field control system. The output of the transistor-magnetic amplifier is applied to the grids of the thyratrons connected in a full-wave rectifier circuit 26. The output of this rectifier circuit 26 supplies the current to the shunt field 27 of the motor 10.

The details of the various circuits of this system are best understood by reference to Figs. 2 through 6. The motor of the system drives a tachometer subcircuit 11 comprising a tachometer proper 30, the output of which is rectified in the bridge rectifier comprising rectifiers 31, 32, 33, and 34. The output of this rectifier is filtered in the filter 12 comprising shunt resistor 35 and capacitor 36. A regulated reference voltage present at a terminal 37 is applied through the acceleration circuit 14 comprising a series resistor 38, and a capacitor 40 connected across it and a shunt capacitor 41 in opposite polarity to the output of the tachometer to develop an error voltage. A set of normally-closed contacts 39 is opened by the operation of the starting button and closes to discharge the capacitor 41 when the motor stops, so that the voltage across capacitor 41 will build up gradually while the motor is starting and there is little or no output from the tachometer 11. This voltage is applied to the input of the grounded collector transistor amplifier stage 16 through the stabilization circuit 15 comprising a series resistor 42 with a capacitor 43 connected across it and shunted by a capacitor 44 and a resistor 45 connected in series. The grounded collector transistor amplifier stage 16 comprises transistor 46 with a collector 47 connected to the low side of the capacitor 41 and to the base 48 through the capacitor 44 and resistor 45. The base is also connected to the stabilization circuit 15. The emitter 50 is connected to the collector 45 through a resistor 51 and a capacitor 52. The junction of the resistor 51 and capacitor 52 is connected to an adjustable regulated source of positive potential 53 through a resistor 54 and a rectifier 55.

The junction of the resistor 54 and the rectifier 55 is connected to the inputs of transistor-magnetic amplifier circuits 17 through the summing circuits 22 and 23, comprising a pair of series resistors 56 and 57 for each circuit 17 and a capacitor 58 connected between the junction of resistors 56 and 57 and a positive terminal 61 through a common resistor 62.

The transistor magnetic amplifier circuits 17 each comprises a transistor 63, the base 64 of which is connected to the emitter 65 through the resistor 57, the capacitor 58, and a resistor 66. The collector 67 of each transistor 63 is connected to its associated emitter 65 through a rectifier 68, the control winding 70 of a saturable reactor 71, a variable resistor 72, the secondary 73 of a transformer 74, and the resistor 66. The primary 75 of the transformer 74 is connected to a source 76 of A. C. potential.

The load winding 77 of each reactor 71 is connected to the input to the thyratron-controlled ignitron-firing circuit 20 through a rectifier 78. The voltage appearing across a second secondary 80 of the transformer 74 is rectified by a second rectifier 81 connected in series with a resistor 82 across the secondary 80 and filtered by the resistor 83 and the capacitor 84. The cathode 85 of each thyratron 86 is made positive with respect to its grid 87 by means of resistor 88 and capacitor 89. The heating power is supplied to each thyratron through a transformer 90 from a source of power 91. The anode 92 of each thyratron 86 is connected to a source of stored energy 93 shown in detail in Fig. 6.

The cathode 85 of each thyratron 86 is connected to the igniter electrode 94 of each ignitron 95 which is connected to the mercury-pool cathode 96 through a resistor 97. The anode 98 of each ignitron 95 is connected to one phase of the three-phase power line through the primary 100 of a transformer 101. Each phase of the power line is also connected through a rectifier 102 to the armature 104 of the motor. The cathode 85 of each ignitron 95 is connected to the armature 104 through the series field winding 105, if one is used.

A resistor 106 is connected across the secondary 107 of each transformer 101. A resistor 108, a rectifier 110, and a capacitor 111 are connected in series across each resistor 106. The junction of each rectifier 110 and capacitor 111 is connected through a resistor 112 to the junction of each pair of resistors 56 and 57. The junction of each rectifier 110 and capacitor 111 is also connected through a resistor 113 to the junction of resistors 51 and 54.

Figure 3:
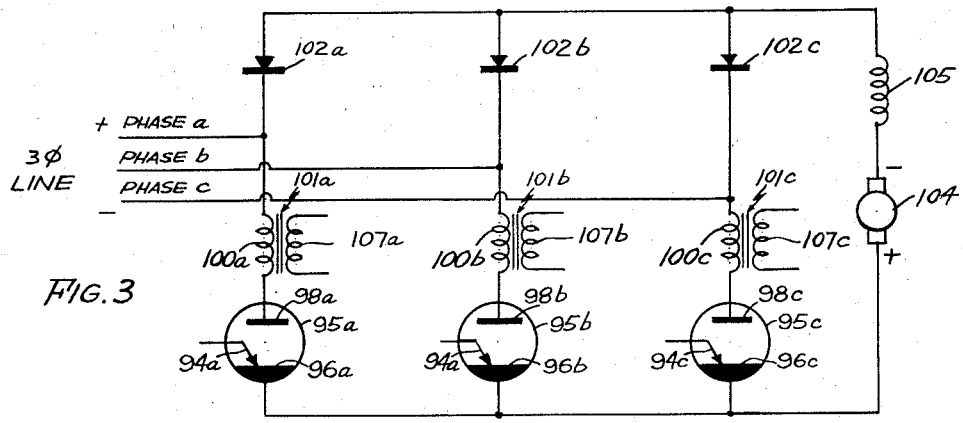
Fig. 3 is a simplified schematic diagram of a portion of the circuit of Fig. 2 showing the three-phase full-wave rectifier supply for the armature.
Figure 4:
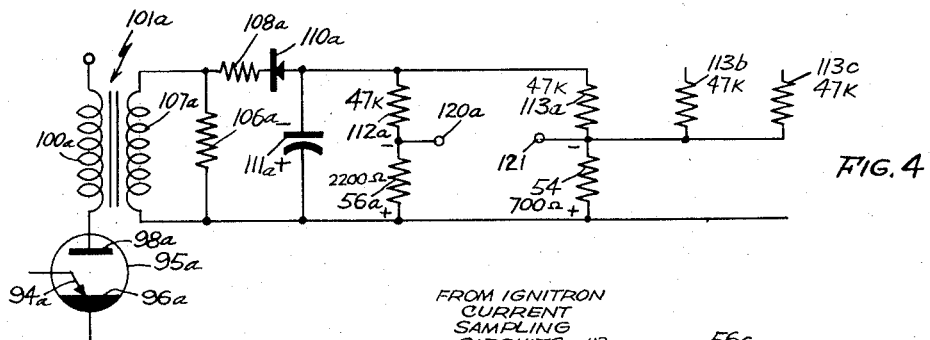
Fig. 4 is a simplified schematic diagram of a portion of the circuit of Fig. 2 in which voltages proportional to the individual and average ignitron currents are obtained.

The operation of the ignitron-controlled three-phase full-wave rectifier is best understood by reference to Fig. 3, in which the ignitron and components associated with each phase of the incoming power line are designated by the addition of the letter $a$, $b$, or $c$. The ignitron between the most positive phase and the most negative phase will be in condition to conduct if the state of the firing circuit 20 connected to its ignitor 94 permits. For example, with phase $a$ most positive and phase $c$ most negative, current will flow from phase $a$ line through the primary 100$a$ of transformer 101$a$, ignitron 95$a$, the armature 104, the series field winding 105, and the rectifier 102$c$, to the line of phase $c$. Other similar circuits can be traced for other points in the cycle. The circuit will always include an ignitron. The firing angle of the ignitron, and thus the average amount of voltage applied to the armature, can be controlled, although only three ignitrons are used instead of the six heretofore used in such rectifier systems. As diode rectifiers of similar current-carrying capacity are much cheaper than ignitrons and their fire-control circuitry, a considerable economy is effected.

With a three-phase system of this sort, it is important that the current carried by each ignition in turn should be equal. The balancing circuit used to obtain this equality is best understood by reference to Fig. 4, where the parts are identified by the same reference numerals as in Fig. 2. For this purpose, a voltage proportional to the current flowing through each ignitron 95 is obtained by means of the transformer 101 and developed across the resistor 106 and rectified by the rectifier 110, the output of which is stored between pulses by the capacitor 111 in the indicated polarity. The resulting voltage is divided between resistors 112 and 56 with a portion appearing in negative polarity across the resistor 56 at terminal 120. These voltages from each such ignitron current are added and averaged by a circuit comprising resistors 113$a$, $b$ or $c$, one for each phase, each connected to the output of the rectifier 110 of the associated phase and a common series resistor 54, across which is developed a voltage equal to the average current through the ignitrons which appears at the terminal 121. It will be noted that resistors 112$a$, $b$, and $c$ and 113$a$, $b$ and $c$ are all of the same value, but resistor 54 is approximately a third of the value of resistor 56. The result is that, if all three ignitrons are passing an equal current, equal negative potentials will appear at terminals 120 and 121. The difference in potential at each of these sets of terminals 120 and 121 will be zero. If any ignitron is carrying greater than the average current, a negative potential difference will appear between terminal 120 and terminal 121. If any ignitron is carrying less than the average current, a positive potential difference will appear between terminal 120 and terminal 121.

Figure 2:
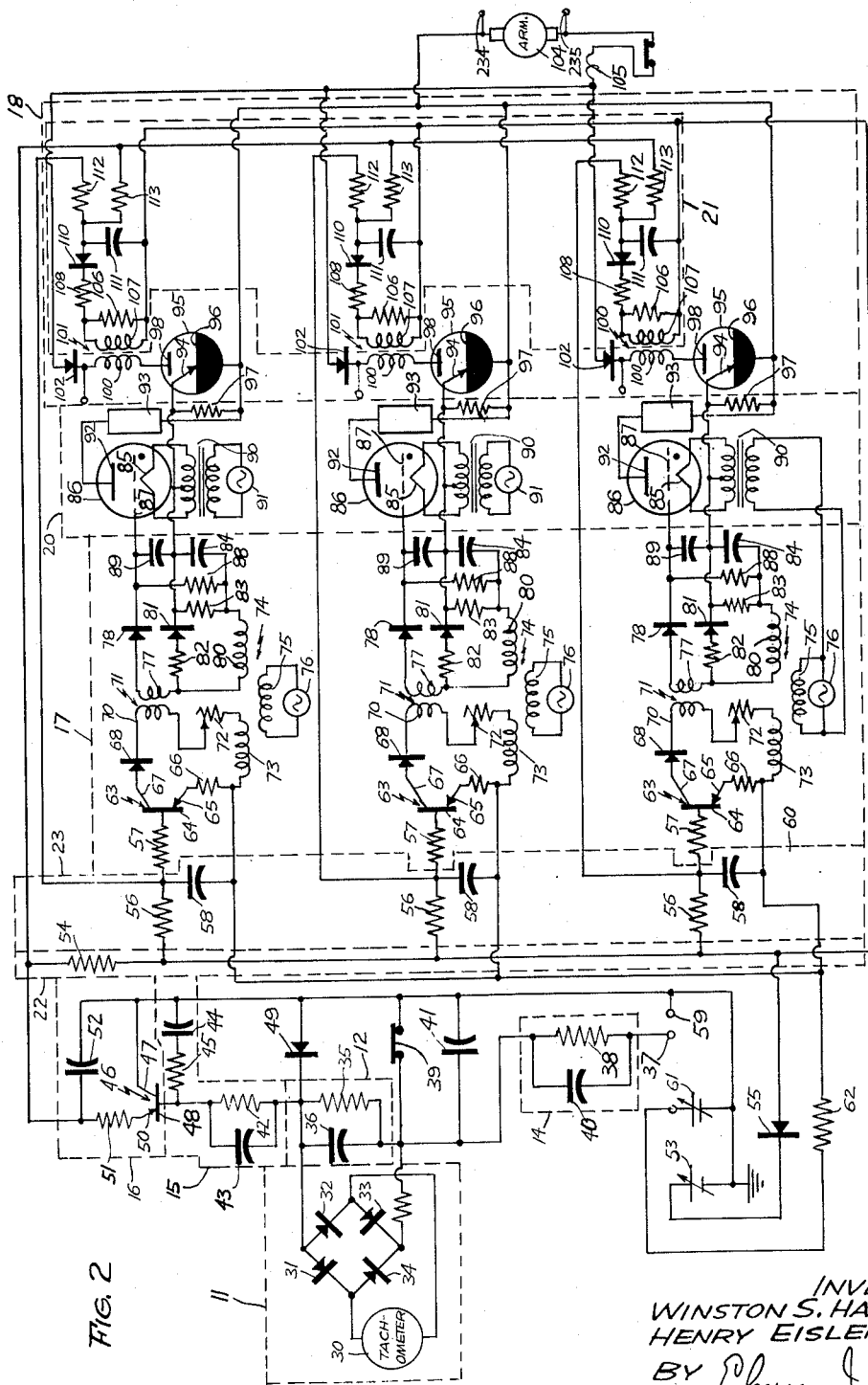
Fig. 2 is a schematic diagram of the armature control portion of the circuit.
Figure 5:
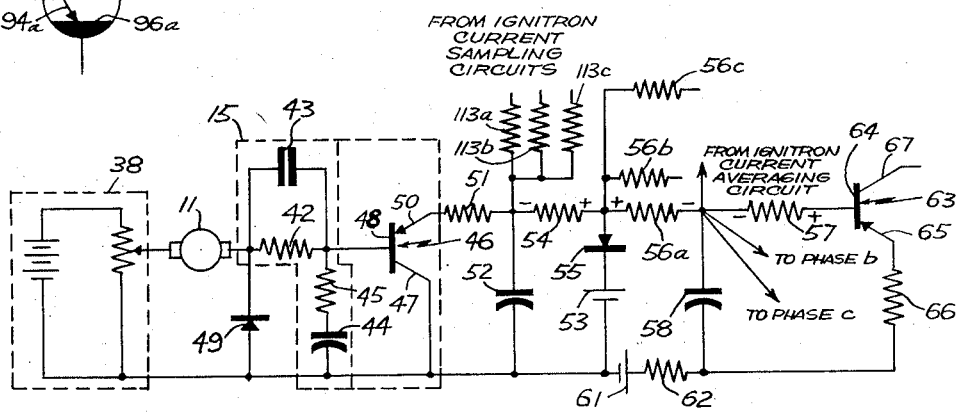
Fig. 5 is a simplified schematic diagram of a portion of the circuit of Fig. 2 in which the voltages obtained in the schematic of Fig. 4 are compared to obtain an error voltage and how the error voltage is utilized to obtain a control signal.

How this potential difference is utilized to correct the balance of current flow is best understood by reference to Fig. 5, in which, as before, the components that also appear in Fig. 2 are given the same reference numerals. The reference voltage from the source 37 is added in series with the output of the tachometer 11, and, after some possible modification in the stabilization circuit 15, is applied between the base 48 and the collector 47 of the grounded collector transistor 46 across the resistor 45 and capacitor 44. The transistor 46 is protected by the zener diode 49 by its conducting in the inverse region when the voltage applied to the input to the transistor is too high. The transistor 46 serves as an impedance matching device to transmit the sum of the reference voltage and the tachometer output to the input of each of the transistors 63 after the addition of any voltage developed by the balancing circuit. When the currents flowing through the ignitrons 95 are equal, no voltage is added to the resultant or error voltage developed by the combination of the reference voltage and the tachometer output which thus controls the signal applied to the input of the transistor 63. When the current through any ignitron 95 is less than the average, the voltage across resisor 56 is less than that across resistor 54, and there is a net positive potential added serially to the error voltage and applied to the transistor 63 associated with that ignitron. When the current passing through an ignitron is greater than the average, the voltage across resistor 56 is greater than that across resistor 54, and there is a net negative potential added serially to the error voltage and applied to the transistor 63 associated with that ignitron.

In addition, the voltage proportional to the current through each ignitron developed across the resistors 56 is added to a fixed voltage from the source 61 and the sum compared with a fixed voltage from the source 53. A diode 55 conducts when these combined voltages exceed the fixed voltage from source 53. The conduction of this diode causes the current flowing between the base 64 and the emitter 65 of the transistor 63 to be increased, increasing the current between the collector 67 and emitter 65, equivalent to a decrease in the impedance in the input circuit of the saturable reactor 71, which causes greater current to flow in the control winding 70 of the saturable reactor 71 saturating it later in the cycle, and, therefore, causing the thyratron 86 and its associated ignitron 95 to fire later, producing less armature current as desired.

The energy storage circuit designated by the reference numeral 93 in Fig. 2 is shown in some detail in Fig. 6 where reference numeral 120 designates an inductance connected between the anode 92 of the thyratron 86 and the center tap 121 on the secondary winding 122 of the transformer 123, the primary 124 of which is connected across a source of potential 125. The center tap 121 is also connected to the grid 126 of the thyratron 127 through a resistor 128. The center tap 121 is also coupled to the anode 130 of the thyratron 127 through a capacitor 131, the secondary 132 of a transformer 133, and a set of normally-open contacts 134 operated when the starting button is pressed. The primary winding 135 of the transformer 133 is connected across a source of potential 136. The charge impressed on the capacitor 131 is discharged through the inductance 120 and the thyratron 86 when it is fired by the firing circuit 17 to impress a sharp igniting pulse across the resistor 97. The capacitor 131 and the inductance 120 are selected for resonance at a frequency that gives the desired pulse width. This circuit makes for a sharply defined conducting angle for the ignitrons.

Figure 7:
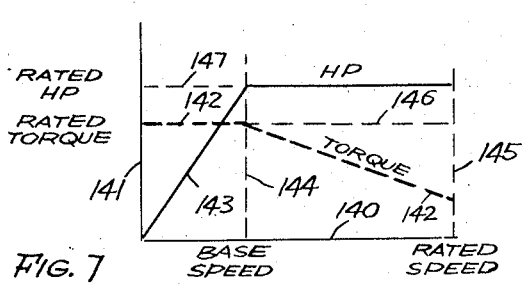
Fig. 7 is a graph of the desired manner in which the H. P. and torque are to vary with speed.
Figure 8:
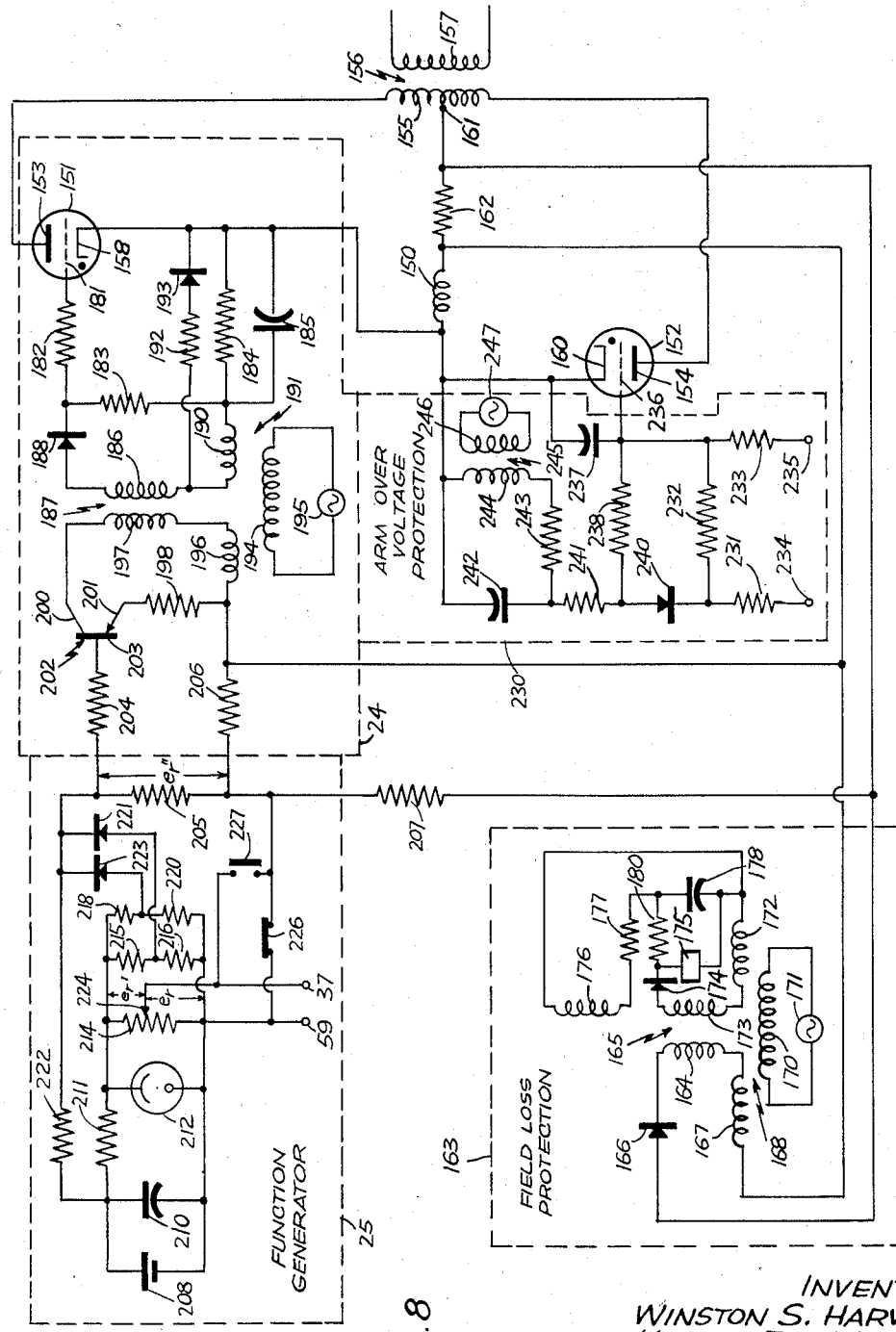
Fig. 8 is a schematic diagram of the field control portion of the circuit.

The operation of the field control circuits is best understood by reference to Figs. 7 and 8. In a direct current motor of this type, speed S is related to the voltage across the armature $V_A$, the current through the armature $I_A$, the resistance of the armature $R_A$ and the flux developed by the field winding $\phi_f$ by the following formula:

$$S = \frac{E_A - I_A R_A}{K_1 \phi_f} \quad (1)$$

where $K_1$ is a proportionality constant determined by the characteristics of the motor. The torque T developed by such a motor is related to the current through the armature, $I_A$, and the flux of the field winding, $\phi_f$, by the following formula:

$$T = K_T I_A \phi_f \quad (2)$$

where $K_T$ is a proportionality constant determined by the characteristics of the motor. The horsepower, H. P., developed by such a motor is related to the speed S, and the torque T by the formula:

$$H.\ P. = KST$$

in which K is a proportionality constant determined by the characteristics of the motor.

It is desirable to operate a motor of this type so that it develops constant torque up to a predetermined base speed and then the torque is reduced proportionately as the speed increases up to the rated speed. It is also desirable to increase the developed horsepower proportionately as the speed is increased up to the base speed and then to hold it constant at this rated horsepower.

These relationships are shown graphically in Fig. 7, where speed is plotted horizontally along the line 140 and the horsepower and torque are plotted vertically along the line 141. The desired variation of torque with speed is shown by the broken line 142, and the desired variation of horsepower with speed is shown by the solid line 143. The base speed is indicated by the dotted line 144, the rated speed by the dotted line 145, the rated torque by the dotted line 146, and the rated horsepower by the dotted line 147.

It can be seen from Equation 1 that, if the speed is to be increased, either armature voltage, $E_A$, must increase, or flux, $\phi_f$, must decrease, or both. In the constant torque region between the minimum and base speed, the field flux is held constant and the speed is increased by increasing the armature voltage.

In the constant horsepower region, the speed is increased by reducing the field flux, $\phi_f$. As H. P. = KST, the horsepower remains constant as T decreases and S increases. It will be seen from Equation 3 that, if the speed, S, increases linearly and the torque, T, remains constant, the horsepower, H. P., will increase linearly, as shown by graph 143, until the base speed, as indicated by the line 144, and the rated horsepower, as indicated by line 147, are reached. If the torque is thereafter decreased linearly with speed, as in the graph 142, the horsepower will remain at the rated value as the speed continues to increase to the rated speed indicated by the line 145. Thus means must be supplied to change the relationship between speed and field current when the base speed is reached.

This and other control means are provided in the field current control circuit shown in Fig. 8.

The current for the shunt field winding 150 is supplied and controlled by a pair of thyratrons 151 and 152. The anodes 153 and 154 of these thyratrons are connected to opposite ends of the secondary winding 155 of a transformer 156, the primary winding 157 of which is connected to a power line. The cathodes 158 and 160 of the thyratrons 152 and 153 are connected to a center tap 161 on the secondary winding 155 of the transformer 156 through the shunt field winding 150 and a resistor 162. The purpose of this resistor is to obtain a control voltage for a field loss protection circuit 163 and negative feedback circuit. This field loss protection circuit is required to prevent the motor from running away when field current is lost for any reason.

In this circuit the resistor 162 is connected across the control winding 164 of a saturable reactor 165 through a rectifier 166 and a secondary 167 of a transformer 168, the primary 170 of which is connected to a source 171 of potential. A second secondary 172 of this transformer is connected in series with a load winding 173 of the saturable reactor 165 and a rectifier 174 across a relay 175 that operates contacts that shut off armature current when for any reason less than the desired minimum shunt field current flows through resistor 162. A feedback winding 176 of the saturable reactor 165 is connected in series with a resistor 177 across a capacitor 178 which is connected in series with a resistor 180 across the relay 175. In operation, to start the motor full field current has to flow and therefore a maximum voltage is developed across resistor 162, which causes the magnetic amplifier to saturate early in the load cycle. A high average current is supplied to the relay coil 175 and parallel capacitor 178 which is enough to energize the relay and charge the capacitor 178 to the peak voltage appearing across the relay 175.

With diminishing field current the voltage appearing across resistor 162 drops and soon not enough average load current flows in the load winding 173 to keep the relay 175 energized. The feedback winding 176, supplied with energy from the condenser 178, tends to maintain the action of the control voltage across 162 up to a certain point. When the field current is reduced to the desired minimum value, the feedback circuit becomes ineffective and the magnetic amplifier core does not become saturated during the load half-cycle. The resulting lowered coil voltage permits the relay 175 to be rapidly de-energized.

The grid 181 of the thyratron 153 is connected to the cathode 158 through resistors 182, 183 and 184. Resistor 184 is shunted by capacitor 185. The junction of resistors 182 and 183 is connected to one end of the load winding 186 of a saturable reactor 187 through a rectifier 188. The other end of the secondary 186 is connected to the junction of resistors 183 and 184 through a secondary 190 of a transformer 191 and to the cathode 158 of the thyratron 151 through a resistor 192 and a rectifier 193. The primary 194 of the transformer 191 is connected across a source of voltage 195. A second secondary 196 of the transformer 191 is connected in series with the control winding 197 of the saturable reactor 187 and the resistor 198 between the collector 200 and emitter 201 of a transistor 202. The base 203 of this transistor is connected to the emitter 201 through resistors 204, 205, 206 and 198. The junction of resistors 205 and 206 is connected to the center tap 161 of transformer 156 through a resistor 207.

The voltage across the resistor 205 is obtained from the function generator 25 which comprises a source of fixed potential 208 shunted by a capacitor 210. A resistor 211 and a voltage regulator tube 212 are connected in series across the capacitor 210. A potentiometer 214 is connected across the tube 212. A pair of resistors 215 and 216 is connected across the potentiometer 214. The junction of the resistor 216 and the potentiometer 214 is connected to the terminal 59 also shown in Fig. 2. Another pair of resistors 218 and 220 is connected across the resistors 215 and 216. The junction of resistors 215 and 216 is connected through a rectifier 221 and a resistor 222 to the junction of the capacitor 210 and the resistor 211. The junction of resistors 218 and 220 is connected through a rectifier 223 and the resistance 222 to the junction of capacitor 210 and the resistor 211. The arm 224 of potentiometer 214 is connected to a terminal 37, also shown in the armature control circuit of Fig. 2. The terminal 59 is connected to the junction of resistors 205 and 207 through a set of normally-closed contacts 226 operated by a relay in the full field starting circuit for the motor (not shown). Terminal 37 is connected to the junction of resistors 205 and 207 through a normally-open set of contacts 227 operated by the above-mentioned relay (not shown). As the motor starts up, the full voltage $e_r+e_{r'}$ across the regulator tube 212 is applied to the input circuitry of the transistor 202. As the speed increases and reaches the base speed, the full field relay in the starting circuit (not shown) operates, opening contacts 226 and closing contacts 227, so that only that portion $e_{r'}$ appearing between the arm 224 of the potentiometer 214 and the junction of potentiometer 214 with the resistor 215 is applied in series with the voltage across the resistor 211 to resistors 222 and 205. As the position of the potentiometer arm 224 is varied for different speed settings, the speed of the motor does not increase linearly due to nonlinearities in other parts of the control and feed circuits. To counteract this nonlinearity, opposing nonlinearities are introduced by means of the function generator circuit 25. The diodes (223 and 221) will conduct when $e_{r'}$ exceeds their bias voltages developed across resistors 215 and 218. When both diodes are conducting, there is a linear relationship between $e_{r'}$ and the voltage $e_{r''}$, with a certain slope. The slope and magnitude of $e_{r''}$ are less with only one diode conducting. When both diodes are not conducting, the voltage across resistor 205 is very low. This in turn reduces the field current to a value which will provide rated speed. Thus, the required nonlinearities in the function generator circuit are adjusted by varying the diode biasing voltages.

If the reference voltage should suddenly be reduced when the motor is operating at rated speed, the motor operates as a generator and the armature voltage tends to reach several times the rated value, four times in a representative case. To prevent this over-voltage, the armature voltage is divided and compared to the breakdown voltage of the zener diode reference voltage circuit. If the sample of the armature voltage exceeds said breakdown voltage, a bias voltage is established across resistor 238 in the grid circuit of the thyratron 152, this bias voltage having the effect of reducing the firing angle of this normally full-firing thyratron. This causes the field current to be reduced to a value which will limit the armature voltage to a safe value.

This is accomplished in the armature over voltage-protection circuit 230 shown in Fig. 8. Resistors 231, 232 and 233 are connected between terminals 234 and 235 connected on either end of the armature 104. The grid 236 is connected to the junction of resistors 232 and 233. A capacitor 237 is also coupled between the grid 236 and the cathode 160 of the thyratron 152. A resistor 238 and a zener diode 240 are connected in series between the grid 236 and the junction of resistors 231 and 232. A resistor 241 and a capacitor 242 are connected in series between the grid 236 and the cathode 160 through resistor 238. A resistor 243 and the secondary 244 of a transformer 245 are connected in series across the capacitor 242. The primary 246 of the transformer 245 is connected to a source of potential 247. As the voltage across the resistor 232 representing the armature voltage increases and reaches the zener point of the diode 240, it conducts in the inverse direction, establishing a D. C. bias on the grid of the thyratron, causing it to conduct later in the A. C. cycle and thus reducing the field current, and, consequently, the armature voltage.

This economical electric motor control circuit is designed to give reliable operation independent of line-voltage variations within 10 percent.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A control system for a D. C. motor having a field winding and an armature, comprising grid-controlled gaseous-discharge means for generating the rated value of D. C. voltage for a field winding of the motor, a plurality of controlled gaseous-discharge devices for generating the rated value of D. C. voltage for the armature winding of said motor, means for obtaining voltages proportional to the current through each controlled gaseous discharge device and means for obtaining a voltage proportional to the average current through the controlled gaseous discharge devices, means for comparing these proportional voltages and means for applying any resulting difference voltage to the control means of the controlled gaseous discharge device the current through which varies from the average in such polarity and amplitude as to correct for the deviation of its current from the average current, means for generating a voltage proportional to the speeed of the motor, a variable source of reference voltage, means for comparing said speed-indicating voltage to said reference voltage, means under control of the difference voltage for controlling the output of the controlled gaseous-discharge voltage-generating means for the armature, and means under control of the reference voltage for controlling the output of the controlled gaseous discharge voltage-generating means for the field winding.

2. A control system for a D. C. motor having a field winding and an armature, comprising grid-controlled gaseous-discharge means for generating the rated value of D. C. voltage for a field winding of the motor, a plurality of controlled gaseous-discharge devices for generating the rated value of D. C. voltage for the armature winding of said motor, means for obtaining voltages proportional to the current through each controlled gaseous discharge device and means for obtaining a voltage proportional to the average current through the controlled gaseous discharge devices, means for comparing these proportional voltages and means for applying any resulting difference voltage to the control means of the controlled gaseous discharge device the current through which varies from the average in such polarity and amplitude as to correct for the deviation of its current from the average current, means for generating a voltage proportional to the speed of the motor, a variable source of reference voltage, means for comparing said reference voltage with the voltage proportional to the current through each controlled gaseous-discharge device and means for applying any resulting difference voltage to the control means for the associated controlled gaseous-discharge device in such polarity that if the current exceeds a predetermined value it will be reduced to this value, means for comparing said speed-indicating voltage to said reference voltage, means under control of the difference voltage for controlling the output of the controlled gaseous-discharge voltage-generating means for the armature, and means under control of the reference voltage for controlling the output of the controlled gaseous-discharge voltage-generating means for the field winding.

3. A control system for a D. C. motor having a field winding and an armature, comprising grid-controlled gaseous-discharge means for generating the rated value of D. C. voltage for a field winding of the motor, controlled gaseous-discharge means for generating the rated value of D. C. voltage for the armature winding of said motor, means for generating a voltage proportional to the speed of the motor, a variable source of reference voltage, means for comparing said speed-indicating voltage to said reference voltage, means under control of the difference voltage for controlling the output of the controlled gaseous-discharge voltage-generating means for the armature, said control means comprising a grounded emitter transistor, a magnetic amplifier with its control winding connected in the output circuit of said transistor and a grid-controlled gaseous-discharge device the firing cycle of which is controlled by the magnetic amplifier output, and means under control of the reference voltage for controlling the output of the controlled gaseous-discharge voltage-generating means for the field winding.

4. A control system for a D. C. motor having a field winding and an armature, comprising grid-controlled gaseous-discharge means for generating the rated value of D. C. voltage for a field winding of the motor, controlled gaseous-discharge means for generating the rated value of D. C. voltage for the armature winding of said motor, means for generating a voltage proportional to the speed of the motor, a variable source of reference voltage, means for comparing said speed-indicating voltage to said reference voltage, means under control of the difference voltage for controlling the output of the controlled gaseous-discharge voltage-generating means for the armature, and means under control of the reference voltage for controlling the output of the controlled gaseous discharge voltage-generating means for the field winding, said controlling means for said controlled gaseous-discharge devices comprising a common emitter transistor controlled by said reference voltage, a magnetic amplifier controlled by the output of said transistor.

5. A control system for a D. C. motor having a field winding and an armature, comprising grid-controlled gaseous-discharge means for generating the rated value of D. C. voltage for a field winding of the motor, controlled gaseous-discharge means for generating the rated value of D. C. voltage for the armature winding of said motor, means for generating a voltage proportional to the speed of the motor, a variable source of reference voltage, means for comparing said speed-indicating voltage to said reference voltage, means under control of the difference voltage for controlling the output of the controlled gaseous-discharge voltage-generating means for the armature, and means under control of the reference voltage for controlling the output of the controlled gaseous-discharge voltage-generating means for the field winding, said controlling means for said controlled gaseous-discharge devices comprising a common emitter transistor controlled by said reference voltage, a magnetic amplifier controlled by the output of said transistor, means for deriving a voltage determined by the current through said field winding, means for combining said voltage with said reference voltage in such polarity and amplitude in the input to the transistor as to maintain the field current constant for a given setting of the reference voltage.

6. A control system for a D. C. motor having a field winding and an armature, comprising grid-controlled gaseous-discharge means for generating the rated value of D. C. voltage for a field winding of the motor, controlled gaseous-discharge means for generating the rated value of D. C. voltage for the armature winding of said motor, means for generating a voltage proportional to the speed of the motor, a variable source of reference voltage, means for comparing said speed-indicating voltage to said reference voltage, means under control of the difference voltage for controlling the output of the controlled gaseous-discharge voltage-generating means for the armature, means under control of the reference voltage for controlling the output of the controlled gaseous-discharge voltage-generating means for the field winding, means for deriving a voltage determined by the current through the field winding, a relay having a set of normally open contacts in series with the armature, and magnetic amplifier means with positive feedback for de-energizing said relay when the field current falls below a predetermined value.

7. A control system for a D. C. motor having a field winding and an armature, comprising grid-controlled gaseous discharge means for generating the rated value of D. C. voltage for a field winding of the motor, controlled gaseous-discharge means for generating the rated value of D. C. voltage for the armature winding of said motor comprising a plurality of controlled gaseous-discharge devices and a diode rectifier, means for obtaining voltages proportional to the current through each controlled gaseous-discharge device and means for obtaining a voltage proportional to the average current through the controlled gaseous-discharge devices, means for comparing these proportional voltages and means for applying any resulting difference voltage to the control means of the controlled gaseous-discharge device, the current through which varies from the average in such polarity and amplitude as to correct for the deviation of its current from the average current, means for generating a voltage proportional to the speed of the motor, a variable source of reference voltage, means for comparing said reference voltage with the voltage proportional to the current through each controlled gaseous-discharge device and means for applying any resulting difference voltage to the control means for the associated controlled gaseous-discharge device in such polarity that if the current exceeds a predetermined value it will be reduced to this value, means for comparing said speed-indicating voltage to said reference voltage, means under control of the difference voltage for controlling the output of the controlled gaseous-discharge voltage-generating means for the armature, said control means comprising a grounded emitter transistor, a magnetic amplifier with its control winding connected in the output circuit of said transistor and a grid-controlled gaseous-discharge device the firing cycle of which is controlled by the magnetic amplifier output, means under control of the reference voltage for controlling the output of the controlled gaseous-discharge voltage-generating means for the field winding, said controlling means for said controlled gaseous-discharge devices comprising a common emitter transistor controlled by said reference voltage, a magnetic amplifier controlled by the output of said transistor, means for deriving a voltage determined by the current through said field winding, means for combining said voltage with said reference voltage in such polarity and amplitude in the input to the transistor as to maintain the field current constant for a given setting of the reference voltage, means for applying a portion of the voltage across the armature to the control circuit of the grid-controlled gaseous-discharge device supplying field power through a solid rectifier connected in inverse polarity so that the rectifier will conduct reducing the field current and so the armature voltage, and means for deriving a voltage determined by the current through the field winding, a relay having a set of normally open contacts, magnetic amplifier means with positive feedback for operating said relay when the field current exceeds a predetermined value.

8. A control system for a D. C. motor having a field winding and an armature, comprising grid-controlled gaseous-discharge means for generating the rated value of D. C. voltage for a field winding of the motor, controlled gaseous-discharge means for generating the rated value of D. C. voltage for the armature winding of said motor, means for generating a voltage proportional to the speed of the motor, a variable source of reference voltage, means for comparing said speed-indicating voltage to said reference voltage, means under control of the difference voltage for controlling the output of the controlled gaseous-discharge voltage-generating means for the armature, said control means comprising a grounded collector transistor, means to apply the fixed potential and the error voltage to the transistor to control the output current, a source of fixed potential for said transistor, a magnetic amplifier with its control winding connected in the output circuit of said transistor and a grid-controlled gaseous-discharge device the firing cycle of which is controlled by the magnetic amplifier output, and means under control of the reference voltage for controlling the output of the controlled gaseous-discharge voltage-generating means for the field winding.

9. A control system for a D. C. motor having a field winding and an armature, comprising grid-controlled gaseous-discharge means for generating the rated value of D. C. voltage for a field winding of the motor, controlled gaseous-discharge means for generating the rated value of D. C. voltage for the armature winding of said motor, a variable source of reference voltage, means comprising at least one biased diode for obtaining a reduced sample of the reference voltage as it increases, and means under control of this sample of the reference voltage for controlling the output of the controlled gaseous-discharge voltage-generating means for the field winding.

10. A control system for a D. C. motor having an armature, comprising controlled gaseous-discharge means for generating the rated value of D. C. voltage for the armature winding of said motor comprising a plurality of controlled gaseous-discharge devices and a diode rectifier, means for obtaining voltages proportional to the current through each controlled gaseous-discharge device and means for obtaining a voltage proportional to the average current through the controlled gaseous-discharge devices, means for comparing these proportional voltages and means for applying any resulting difference voltage to the control means of the controlled gaseous-discharge device the current through which varies from the average in such polarity and amplitude as to correct for the deviation of its current from the average current, means for generating a voltage proportional to the speed of the motor, a variable source of reference voltage, means for comparing said speed-indicating voltage to said reference voltage, means under control of the difference voltage for controlling the output of the controlled gaseous-discharge voltage-generating means for the armature.

11. A control system for a D. C. motor having an armature, comprising controlled gaseous-discharge means for generating the rated value of D. C. voltage for the armature winding of said motor comprising a plurality of controlled gaseous discharge devices and a diode rectifier, means for obtaining voltages proportional to the current through each controlled gaseous discharge device and means for obtaining a voltage proportional to the average current through the controlled gaseous discharge devices, means for comparing these proportional voltages and means for applying any resulting difference voltage to the control means of the controlled gaseous discharge device the current through which varies from the average in such polarity and amplitude as to correct for the deviation of its current from the average current, means for generating a voltage proportional to the speed of the motor, a variable source of reference voltage, means for comparing said reference voltage with the voltage proportional to the current through each controlled gaseous-discharge device and means for applying any resulting difference voltage to the control means for the associated controlled gaseous-discharge device in such polarity that if the current exceeds a predetermined value it will be reduced to this value, means for comparing said speed-indicating voltage to said reference voltage, and means under control of the difference voltage for controlling the output of the controlled gaseous-discharge voltage-generating means for the armature.

References Cited in the file of this patent

UNITED STATES PATENTS

| | | |
|---|---|---|
| 2,288,339 | Willis | June 30, 1942 |
| 2,530,949 | Cotner | Nov. 21, 1950 |
| 2,530,993 | Roman | Nov. 21, 1950 |
| 2,720,621 | Shrider | Oct. 11, 1955 |
| 2,802,977 | Harvey et al. | Aug. 13, 1957 |